United States Patent
Lin et al.

(10) Patent No.: US 7,173,833 B2
(45) Date of Patent: Feb. 6, 2007

(54) ENERGY EFFICIENT POWER SUPPLY DEVICE AND OPERATING METHOD THEREOF

(75) Inventors: Kun-Chi Lin, Taoyuan Hsien (TW); Youjun Zhang, Taoyuan Hsien (TW); Qinggang Kong, Taoyuan Hsien (TW); Junshan Lou, Taoyuan Hsien (TW); Hongjian Gan, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 130 days.

(21) Appl. No.: 10/908,159

(22) Filed: Apr. 29, 2005

(65) Prior Publication Data

US 2006/0120120 A1    Jun. 8, 2006

(30) Foreign Application Priority Data

Dec. 3, 2004    (TW) .............................. 93137339 A

(51) Int. Cl.
*H02M 7/23*    (2006.01)
(52) U.S. Cl. .......................................... 363/65; 363/16
(58) Field of Classification Search ................. 363/16, 363/21.01, 65–72, 78, 81, 84, 95, 97
See application file for complete search history.

(56) References Cited

U.S. PATENT DOCUMENTS

| | | | | |
|---|---|---|---|---|
| 5,353,215 A | * | 10/1994 | Dinwiddie et al. | ............ 363/65 |
| 6,430,062 B1 | * | 8/2002 | Shin | ........................ 363/21.01 |
| 6,909,621 B2 | * | 6/2005 | Lee | .............................. 363/81 |

* cited by examiner

*Primary Examiner*—Jessica Han
(74) *Attorney, Agent, or Firm*—Jianq Chyun IP Office

(57) ABSTRACT

A power supply device and an operating method thereof are provided. The power supply device includes a main converter and an auxiliary converter. The main converter includes a power factor corrector (PFC), a first capacitor that connects in parallel with the PFC and a DC/DC converter that connects in parallel with the first capacitor. The auxiliary converter is connected in parallel to the main converter. When the power supply device operates in a normal mode, the main converter and the auxiliary converter together provide a first output to an output load. When the power supply device is in a standby mode, the DC/DC converter is turned off so that only the auxiliary converter provides a second output to the output load. Meanwhile, the PFC is in operation to maintain the voltage of the first capacitor in order to meet the demand of the output dynamic response of the main converter.

18 Claims, 5 Drawing Sheets

ENERGY EFFICIENT POWER SUPPLY DEVICE AND OPERATING METHOD THEREOF

CROSS-REFERENCE TO RELATED APPLICATION

This application claims the priority benefit of Taiwan application Ser. No. 93,137,339, filed on Dec. 3, 2004. All disclosure of the Taiwan application is incorporated herein by reference.

BACKGROUND OF THE INVENTION

1. Field of the Invention

The present invention relates to a power supply device and an operating method thereof. More particularly, the present invention relates to the topological structure and operating method of an energy efficient switching mode power supply device.

2. Description of the Related Art

In the design of a switching mode power source, a system requires high switching efficiency, high power density, high reliability, low production cost and quick dynamic response to a loading. With the worldwide campaign for saving energy, all switching mode power sources are demanded to have low standby power wastage. In this regard, various international organizations including the International Energy Association (IEA), the United States and many European countries have proposed or are planning a set of related standards to limit the power consumed by an electronic product using a switching mode power source in a standby mode.

The standard recommended by IEA and European countries includes a power source with a labeled input rating of 75 W or less, the non-loaded loss should be smaller than 0.75 W after 1 st Jan. 2003. For a power source having a labeled input rating in excess of 75 W, no stated standard has been set yet. However, it is believed that more stringent standard will be established for large power sources in the future.

Currently, some of the methods for reducing standby power consumption include the following.

1. Lowering the switching frequency of a converter in the standby mode—Because a large portion of the energy consumed in the standby mode is the switching of power device, lowering the switching frequency can effectively reduce switching waste and hence reduces power waste in the standby mode. However, if this method is deployed to save energy, audio-noise will appear when the switching frequency is lowered to 20 KHz or below. Thus, some manufacturers developing this type of energy-saving control chips have to deploy frequency jolting and peak current limitation techniques to weaken or reduce noise signals. In addition, the method of reducing the switching frequency is only applicable to a pulse width modulation (PWM) converter.

2. Switches being operated intermittently—Through controlling the voltage differential amplifying signal or directly controlling the output voltage, the converters can operate intermittently in the standby mode. With this setup, the switching frequency per unit time is lowered and hence the switching waste is reduced. However, the ripple wave of the output voltage in the standby mode is considerably large and acoustic frequency noise signal is more likely to appear. Moreover, this method can be applied to a PWM converter and a resonance converter only.

3. Operating using small-power switches—In general, the switching loss and driving loss is related to the parameters of parasitic capacitor in a power device. For example, a small-power switch has a smaller parasitic capacitance. Hence, using a small-power switch in the standby mode can reduce the switching loss and driving loss of a converter.

Although all the aforementioned methods can reduce power loss in the standby mode, they can hardly meet some of the more stringent requirements for reducing power loss in switching mode power sources with a larger output power. For example, Dell, a U.S. Corporation, demands a power loss of 1 W for a 150 W device, which means when the power source outputs 0.5 W to a loading, the input power cannot exceed 1 W. Besides, the power source needs to have high switching efficiency, high power density, high reliability, low production cost and quick dynamic response to a loading.

SUMMARY OF THE INVENTION

Accordingly, at least one objective of the present invention is to provide a power supply device having a main converter and an auxiliary converter connected in parallel to form an output topological structure for providing output power. Under a normal load, the main converter provides most of the power and the auxiliary converter operates in a power-limited mode (that is, the output power is less than a fixed value). In the standby mode, the main converter is shut down so that output power to the load is provided solely through the auxiliary converter. In the meantime, the output dynamic response of the main converter is maintained through a power factor corrector (PFC) and a first capacitor. Therefore, high switching efficiency and low standby loss are achieved.

At least another objective of the present invention is to provide a method of operating a power supply device having a main converter and an auxiliary converter. When the power supply device is in a standby mode, the main converter is shut down so that the auxiliary converter provides all the power output to the load. In the meantime, the output dynamic response of the main converter is maintained through a power factor corrector and a first capacitor.

To achieve these and other advantages and in accordance with the purpose of the invention, as embodied and broadly described herein, the invention provides a power supply device. The power supply device mainly comprises a main converter and an auxiliary converter. The main converter further comprises a power factor corrector (PFC), a first capacitor that connects in parallel with the PFC and a DC/DC converter that connects in parallel with the first capacitor. The auxiliary converter is connected in parallel to the main converter. When the power supply device operates in a normal mode, the DC/DC converter of the main converter and the auxiliary converter together provide a first output to an output load. When the power supply device is in a standby mode, the DC/DC converter is turned off so that only the auxiliary converter provides a second output to the output load. In the meantime, the PFC maintains the voltage of the first capacitor to meet the demand of the output dynamic response of the main converter.

According to one preferred embodiment of the present invention, the power supply device further comprises a rectifier and a second capacitor. The rectifier is coupled to the input terminal of the main converter and the auxiliary converter. The second capacitor is connected in parallel to the output terminal of the main converter and the auxiliary converter.

According to one preferred embodiment of the present invention, the main converter in the power supply device further comprises a first optical coupler and a first controller. The first optical coupler and the output load are connected together for detecting the operating state of the power supply device and outputting a first control signal accordingly. The first controller and the optical coupler are connected together for receiving the first control signal and outputting a second control signal to control the DC/DC converter.

According to one preferred embodiment of the present invention, the auxiliary converter in the power supply device further comprises a second optical coupler and a second controller. The second optical coupler and the output load are connected together for detecting the operating state of the power supply device and outputting a third control signal. The second controller and the second optical coupler are connected together for receiving the third control signal to control the auxiliary converter accordingly.

According to one preferred embodiment of the present invention, the DC/DC converter and the auxiliary converter in the power supply device are pulse width modulation (PWM) converters. For example, the DC/DC converter can be an asymmetrical half bridge converter, the power factor corrector can be a boost converter and the auxiliary converter can be a flyback converter.

The present invention also provides a method of operating a power supply device comprising the following steps. First, the operating mode of the power supply device is detected. When the power supply device operates in a normal mode, the DC/DC converter of the main converter and the auxiliary converter are controlled to provide a first output to the output load. When the power supply device is in a standby mode, the main converter is shut down so that only the auxiliary converter provides a second output to the output load. In the meantime, the output dynamic response of the main converter is maintained through the power factor corrector and the first capacitor.

In the present invention, a main/auxiliary converter output parallel connected topological structure is deployed so that the main and the auxiliary converter can provide the output power together. Thus, under a normal loading, most of the power is supplied by the main converter while the auxiliary converter operates in a power-limited mode (the output power is always below a fixed value). In the standby mode, the output power is entirely supplied by the auxiliary converter so that the main converter is no longer in operation. Therefore, a high switching efficiency and low standby energy consumption can be achieved at the same time. Furthermore, because the capacitor is disposed in parallel between the power factor corrector and the DC/DC converter, the voltage at the first capacitor can be maintained through the power factor corrector in the standby mode to satisfy the output dynamic response of the main converter.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
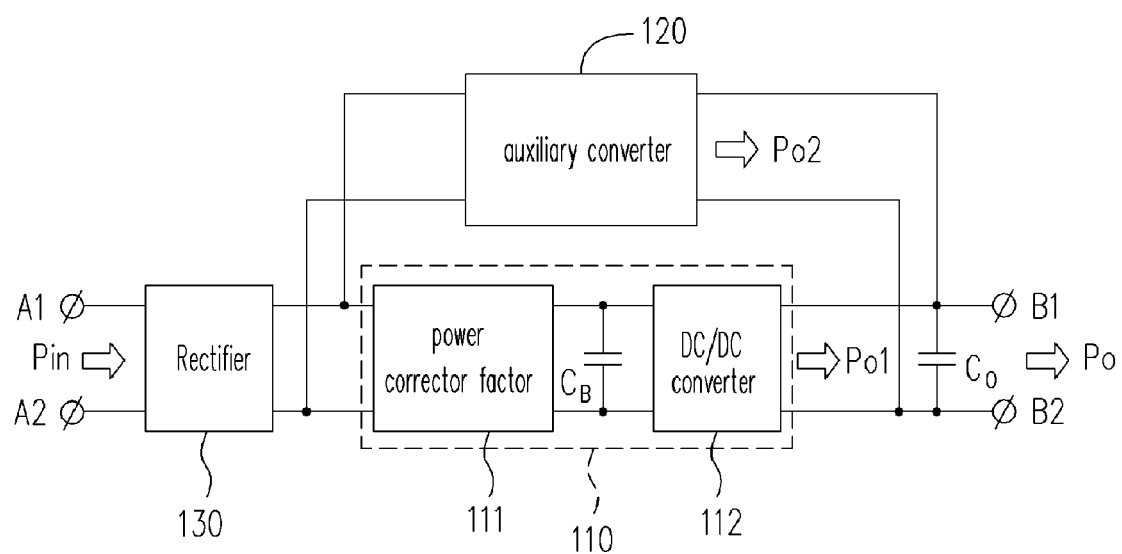
FIG. 1 is a block diagram showing a main/auxiliary converter output parallel connected topological structure according to one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing a main/auxiliary converter output parallel connected topological structure according to one preferred embodiment of the present invention. As shown in FIG. 1, the main converter 110 and the auxiliary converter 120 are connected in parallel at points A1, A2 and B1, B2. Furthermore, the input power Pin picked up at points A1, A2 are rectified by a rectifier 130 before distributing to the main converter 110 and the auxiliary converter 120. The points A1, A2 represent the input terminals of the switching mode power source. Typically, the points A1 and A2 are connected to an alternating current power source. The points B1, B2 represent the output terminals of the switching mode power source that provide an output power Po. Typically, the points B1 and B2 are connected to an output load.

To meet the high switching efficiency and high power density requirements of a switching mode power source, the optimization point for efficiency in designing the main converter is in the vicinity of full loading. Therefore, the efficiency of the main converter at a light loading is relatively low. If the main converter of the power supply device also provides the necessary power in the standby mode, the amount of energy wasted will be significant. Since the auxiliary converter has a low power output, the auxiliary converter can be optimized for efficiency at the standby mode so that the amount of energy loss in the standby mode is minimized.

The main converter 110 can be a single stage or a multi-stage structure for providing main power output during a full loading condition. The auxiliary converter 120 not only supplies a small amount of output loading (the maximum output power of the auxiliary converter 120 is limited), but also supplies power to the control system. In the standby mode, the main converter 110 does not provide any power output and hence all output power comes from the auxiliary converter 120. In the normal operating mode, the main converter 110 and the auxiliary converter 120 together provide the necessary output power (the maximum output power of the auxiliary converter 120 is limited).

In the present embodiment, the main converter 110 has a two-stage structure, comprising a power factor corrector (PFC) 111 and a DC/DC converter 112. A first capacitor CB capable of storing energy and stabilizing voltage is connected in parallel between the PFC 111 and the DC/DC converter 112. Furthermore, a second capacitor CO is connected in parallel to the output terminal set of the DC/DC converter 112.

When the power supply device operates in a normal operating mode, the DC/DC converter of the main converter and the auxiliary converter together provide a first output power to an output load. Meanwhile, in the standby mode, the DC/DC converter 112 is shut down so that it no longer operates (to reduce standby power loss) and only the auxiliary converter 120 provides a second output power to the output load. At this moment, however, the PFC 111 still operates to maintain a stable voltage in the first capacitor CB so that the system can satisfy the dynamic response of the output load. In the initial stage of returning to work in the normal operating mode, the first capacitor CB provides the necessary stable voltage for power switching the DC/DC converter 112.

Figure 2:
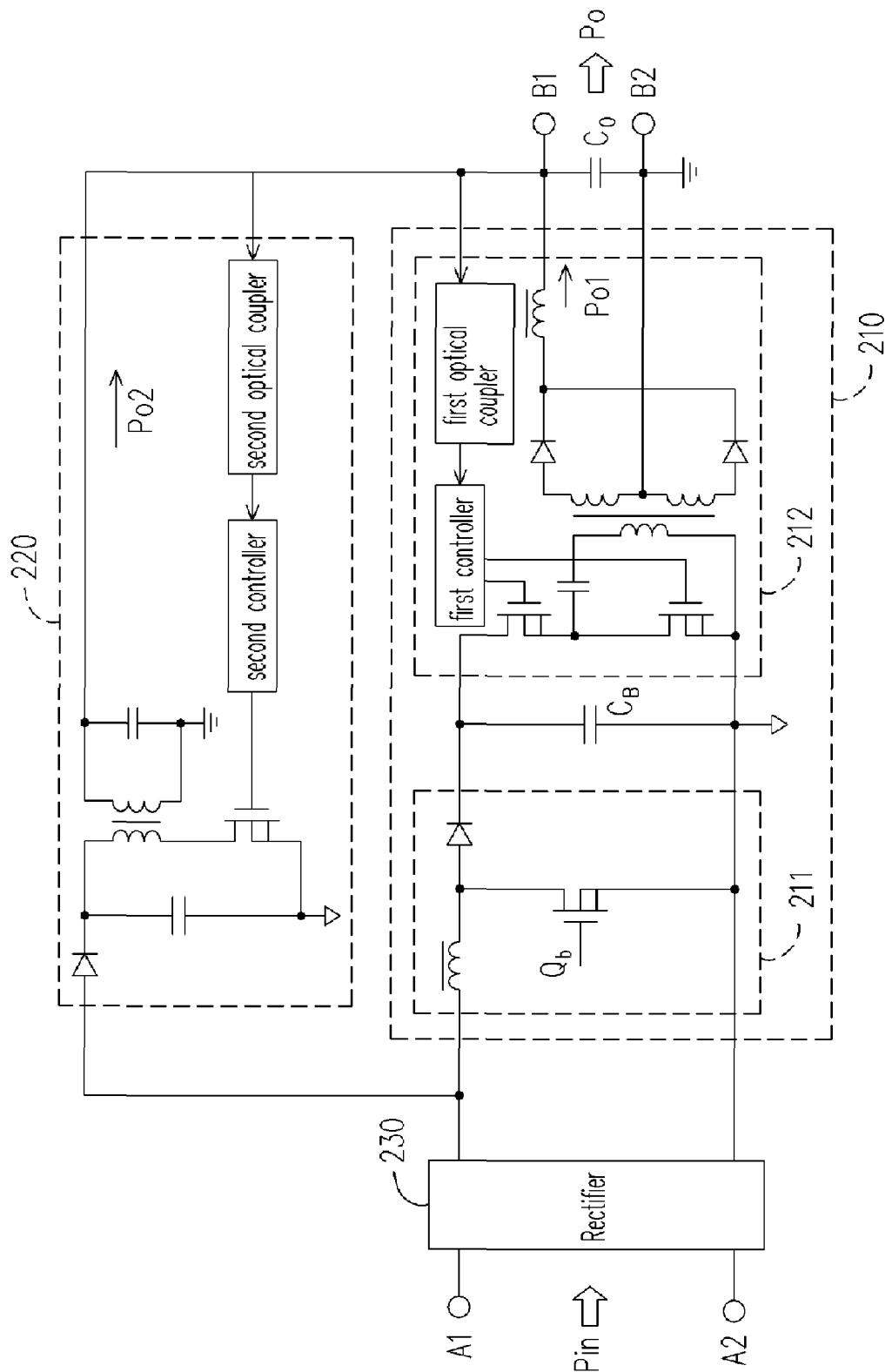
FIG. 2 is a circuit diagram of a main/auxiliary converter output parallel connected topological structure according to one preferred embodiment of the present invention.

The aforementioned auxiliary converter 120, PFC 111 and DC/DC converter 112 can be implemented in a configuration shown in FIG. 2. FIG. 2 is a circuit diagram of a main/auxiliary converter output parallel connected topological structure according to one preferred embodiment of the present invention. The auxiliary converter 220, for example, deploys a flyback converter topological structure. In the present embodiment, the auxiliary converter 220 further comprises a second optical coupler and a second controller. The second optical coupler and the output load are connected together for detecting the operating state (for example, detecting the output loading state of the output power Po) of the power supply device and outputting a third control signal accordingly. The second controller and the second optical coupler are connected together for receiving the third control signal and controlling the output power Po2 of the auxiliary converter 220.

The main converter 210 has a two-stage structure comprising a PFC 211 and a DC/DC converter 212. The PFC 211 deploys a boost converter structure and the DC/DC converter 212 deploys an asymmetrical half bridge converter (AHBC), for example. Since the details of the boost converter, the AHBC circuit and the flyback circuit should be familiar to those skilled in the technique, a description is not repeated here. In the present embodiment, the main converter 210 further comprises a first optical coupler and a first controller. The first optical coupler and the output load are connected together for detecting the operating state (for example, detecting the output loading state of the output power Po of the power supply device) of the power supply device and outputting a first control signal accordingly. The first controller and the first optical coupler are connected together for receiving the first control signal to determine the pulse width of a second control signal and using the second control signal to control the DC/DC converter 212. According to the second control signal, the DC/DC converter 212 converts the electrical energy output from the PFC 211 to output power Po1.

Figure 3:
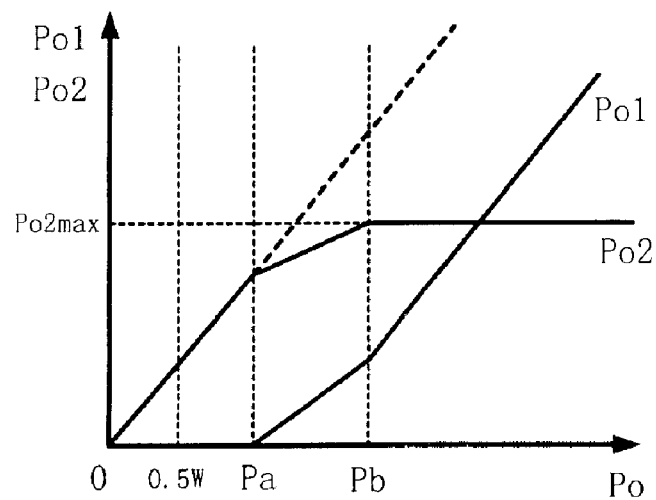
FIG. 3 is a graph showing the power output at various output loading conditions according to one preferred embodiment of the present invention.

FIG. 3 is a graph showing the power output at various output loading conditions according to one preferred embodiment of the present invention. As shown in FIG. 3, the horizontal axis represents the total output power Po of the power supply device and the vertical axis represents the output power Po1 of the main converter and the output power Po2 of the auxiliary converter Po2. The sum of the output powers Po1 and Po1 is equal to the output power Po. When the output power Po is between 0~Pa (the standby state), the main converter provides none of the output, that is, Po1=0, Po2=Po. When the output power Po is between Pa~Pb (a lightly loaded operating state), the main converter starts to provide an output, that is, Po=Po1+Po2. When the output power Po is greater than Pb (in the normal operating state), the main converter and the auxiliary converter together provide the output power. The auxiliary converter operates in a power-limited output mode, that is, Po2=Po2max.

Figure 4:
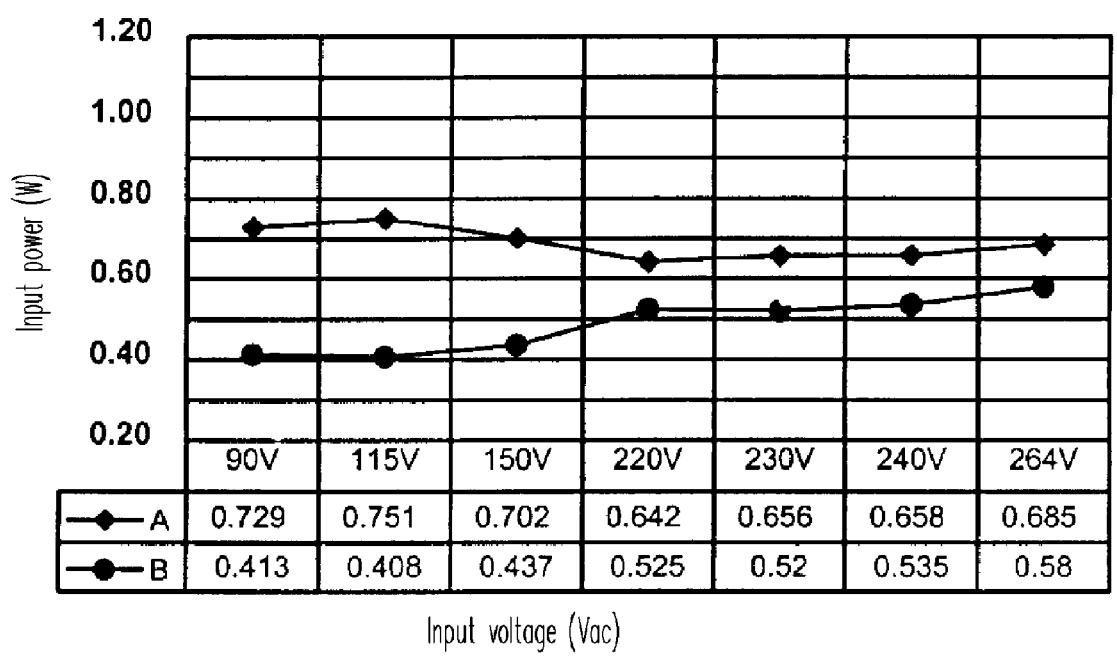
FIG. 4 is a tabulation of the non-loaded loss.

The test results in the following description are based on a 150 W, 12V/12.5 A output distributor employing the aforementioned embodiment. FIG. 4 is a tabulation of the non-loaded loss. In FIG. 4, the vertical axis represents the input power and the horizontal axis represents the input voltage. As shown in FIG. 4, line A indicates the non-loaded loss of a conventional 150 W, 12V/12.5 A power supply device at different input voltages. Meanwhile, line B indicates the non-loaded loss of a power supply device according to the embodiment of the present invention at the same output conditions but different input voltages. It is obvious from lines A and B that there is a drop of non-loaded loss between 0.105~0.343 W in the system of the present invention, especially at the low input voltage section.

Figure 5:
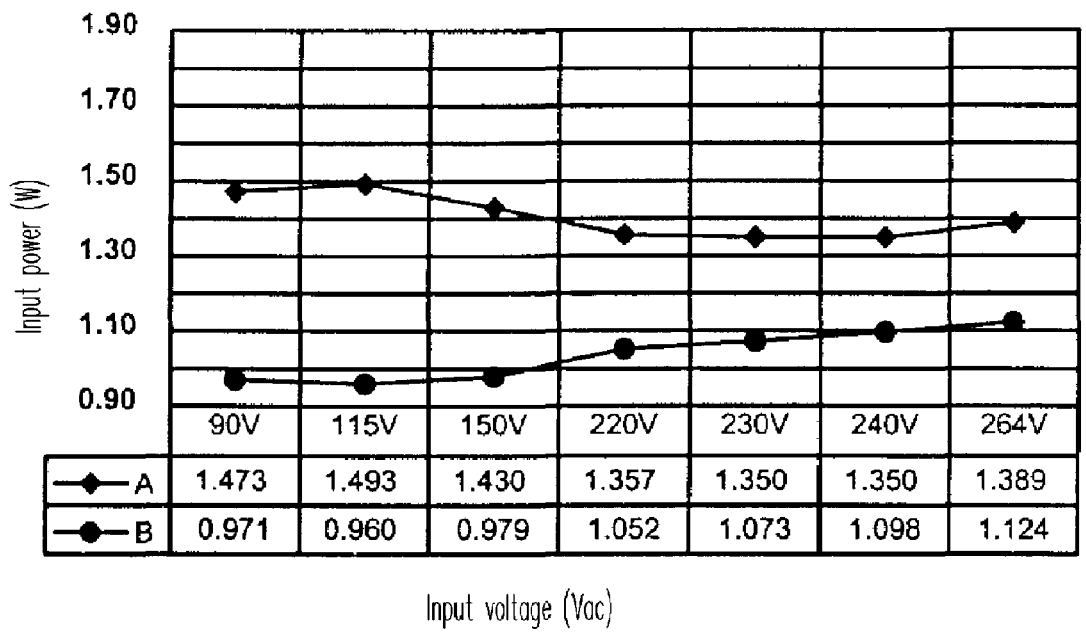
FIG. 5 is a tabulation of the input power at 0.5 W output loading.

FIG. 5 is a tabulation of the input power at 0.5 W output loading. As shown in FIG. 5, line A indicates the input power of a conventional 150 W, 12V/12.5 A power supply device at different input voltages and at a 0.5 W output loading. Meanwhile, line B indicates the input power of a power supply device according to the embodiment of the present invention at the same conditions and at a 0.5 W output loading but different input voltages. It is obvious from lines A and B that there is a drop of the input power between 0.257~0.533 W in the system of the present invention for a 0.5 W output loading, particularly at the low input voltage section. When the input voltage is between 90V~150V, the standby loss is smaller than 1 W.

Figure 6:
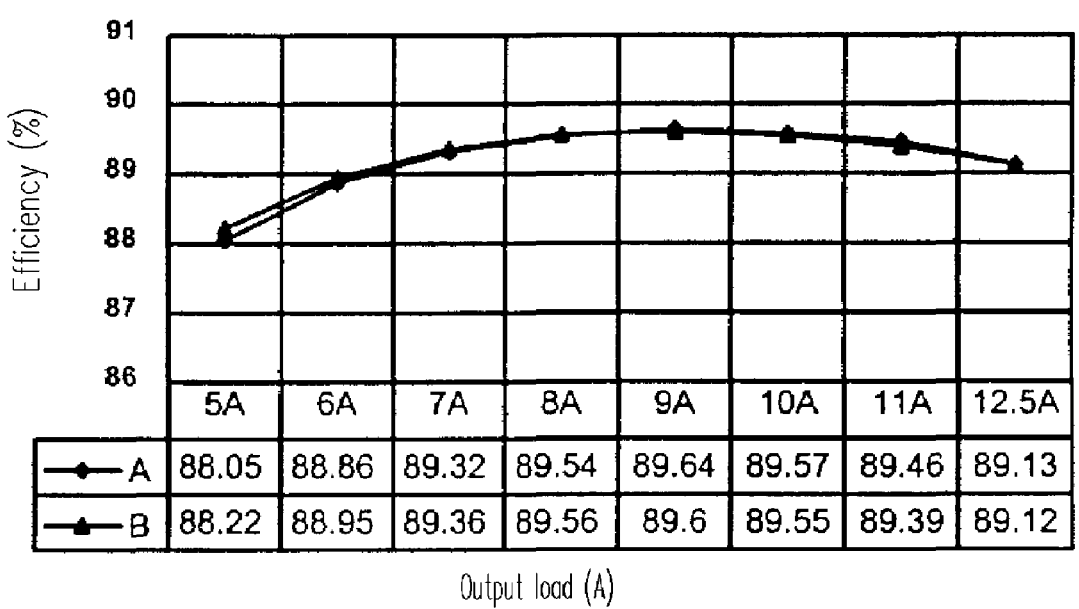
FIG. 6 is a tabulation of the percentage efficiency for different output loading at an input voltage of 90V.

FIG. 6 is a tabulation of the percentage efficiency for different output loadings at an input voltage of 90V. In FIG. 6, the vertical axis represents the percentage efficiency and the horizontal axis represents the output loading. As shown in FIG. 6, line A indicates the efficiency of a conventional 150 W, 12V/12.5 A power supply device at different output loadings. Meanwhile, line B indicates the efficiency of a power supply device according to the embodiment of the present invention at the same conditions but different output loadings. Since lines A and B almost overlap each other, it indicates that the present invention has no impact on system efficiency.

Figure 7:
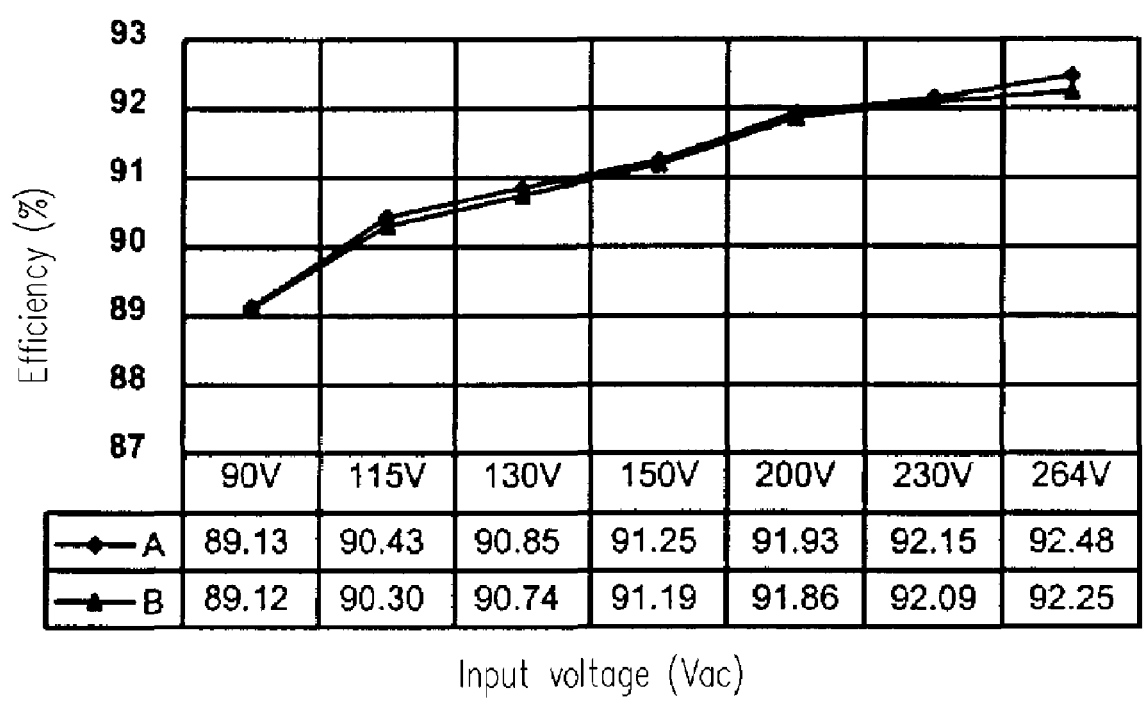
FIG. 7 is a tabulation of the percentage efficiency for different input voltage at full loading condition.

FIG. 7 is a tabulation of the percentage efficiency for different input voltages at the full loading condition. In FIG. 7, the vertical axis represents the efficiency and the horizontal axis represents the input voltage. As shown in FIG. 7, line A indicates the full loading efficiency of a conventional 150 W, 12V/12.5 A power supply device at different input voltages. Meanwhile, line B indicates the full loading efficiency of a power supply device according to the embodiment of the present invention at the same conditions but different input voltages. Since lines A and B almost overlap each other, it illustrates that the present invention does not influence the system efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply device, comprising:
   a main converter having a power factor corrector, a first capacitor connected in parallel with the power factor corrector and a DC/DC converter connected in parallel with the first capacitor; and
   an auxiliary converter connected in parallel with the main converter;
   wherein the DC/DC converter of the main converter and the auxiliary converter together provide a first output to an output load when the power supply device operates in a normal operating mode; and
   when the power supply device operates in a standby mode, the DC/DC converter is shut down so that only the auxiliary converter provides a second output to the output load while the power factor corrector still operates to maintain the voltage at the first capacitor and satisfy the output dynamic response of the main converter.

2. The power supply device of claim 1, further comprises a rectifier coupled to the input terminal of the main converter and the auxiliary converter.

3. The power supply device of claim 1, further comprises a second capacitor connected in parallel with the output terminal of the main converter and the auxiliary converter.

4. The power supply device of claim 1, wherein the main converter further comprises:
   a first optical coupler connected to the output load for detecting the operating state of power supply device and outputting a first control signal accordingly; and
   a first controller connected to the first optical coupler for receiving the first control signal and outputting a second control signal to control the DC/DC converter.

5. The power supply device of claim 1, wherein the auxiliary converter further comprises:
   a second optical coupler connected to the output load for detecting the operating state of the power supply device and outputting a third control signal accordingly; and
   a second controller connected to the second optical coupler for receiving the third control signal to control the auxiliary converter.

6. The power supply device of claim 1, wherein the DC/DC converter and the auxiliary converter are pulse width modulation (PWM) converters.

7. The power supply device of claim 1, wherein the DC/DC converter is an asymmetric half bridge converter.

8. The power supply device of claim 1, wherein the power factor corrector is a boost converter.

9. The power supply device of claim 1, wherein the auxiliary converter is a flyback converter.

10. A method of operating a power supply device having a main converter and an auxiliary converter connected in parallel with the main converter, wherein the main converter further comprises a power factor corrector, a first capacitor connected in parallel with the power factor corrector and a DC/DC converter connected in parallel with the first capacitor, the steps of operating the power supply device comprising:
    detecting the operating mode of the power supply device;
    when the power supply device operates in a normal operating mode:
       controlling the DC/DC converter of the main converter and the auxiliary converter to provide a first output to an output load together; and
    when the power supply device operates in a standby mode:
    shutting down the main converter so that only the auxiliary converter provides a second output to the output load while the power factor corrector still operates to maintain the voltage on the first capacitor and satisfy the output dynamic response of the main converter.

11. The operating method of claim 10, further comprises providing a rectifier coupled to the input terminal of the main converter and the auxiliary converter.

12. The operating method of claim 10, further comprises providing a second capacitor connected in parallel with the output terminal of the main converter and the auxiliary converter.

13. The operating method of claim 10, wherein the main converter further comprises:
    a first optical coupler connected to the output load for detecting the operating state of power supply device and outputting a first control signal accordingly; and
    a first controller connected to the first optical coupler for receiving the first control signal and outputting a second control signal to control the DC/DC converter.

14. The operating method of claim 10, wherein the auxiliary converter further comprises:
    a second optical coupler connected to the output load for detecting the operating state of the power supply device and outputting a third control signal accordingly; and
    a second controller connected to the second optical coupler for receiving the third control signal to control the auxiliary converter.

15. The operating method of claim 10, wherein the DC/DC converter and the auxiliary converter are pulse width modulation (PWM) converters.

16. The operating method of claim 10, wherein the DC/DC converter is an asymmetric half bridge converter.

17. The operating method of claim 10, wherein the power factor corrector is a boost converter.

18. The operating method of claim 10, wherein the auxiliary converter is a flyback converter.

* * * * *